July 19, 1960 F. K. BEYER 2,945,543
GARDEN TOOL
Filed March 31, 1958
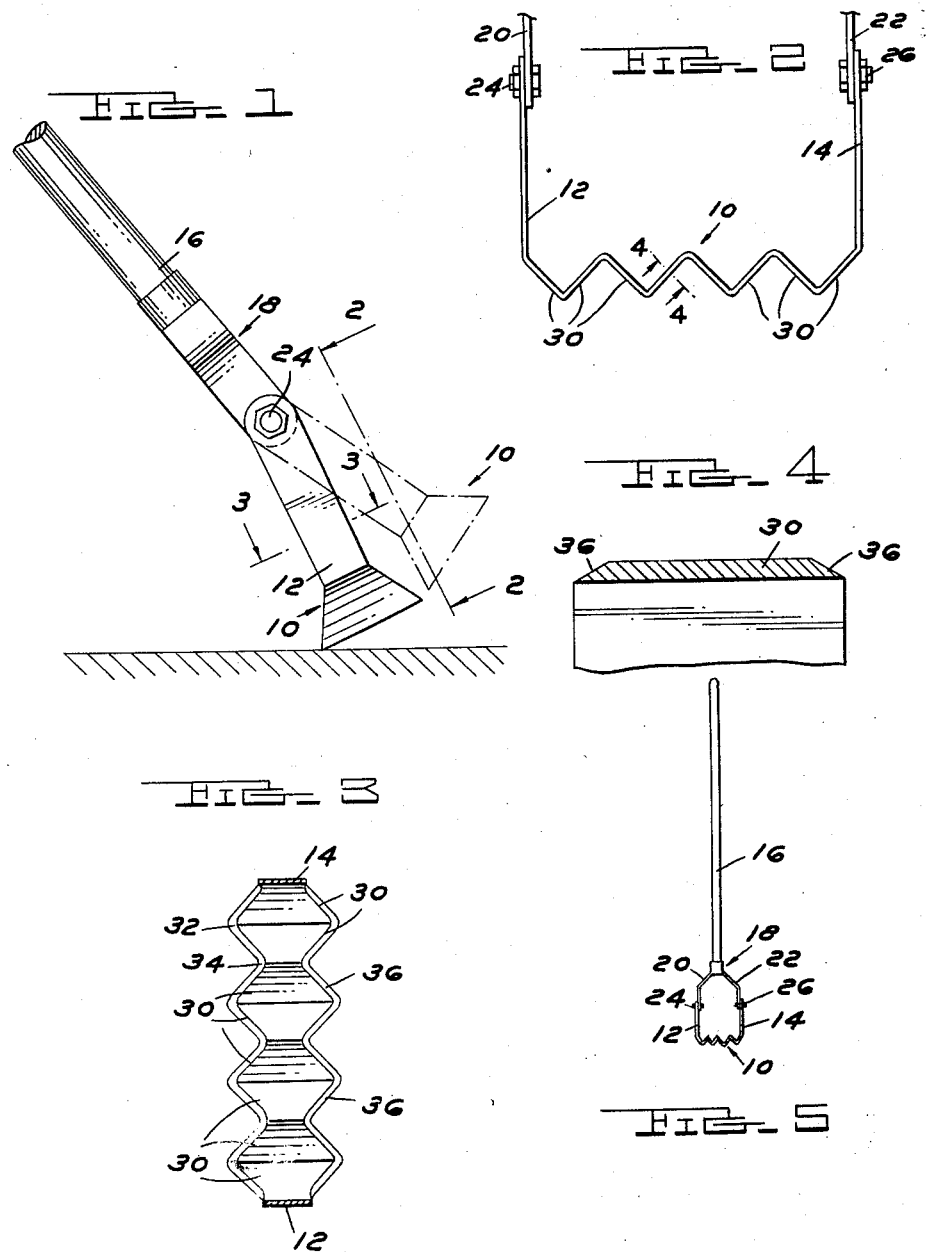
INVENTOR.
FRED K. BEYER
BY
Barney, Kisselle, Raisch & Choate
ATTORNEYS

2,945,543
GARDEN TOOL

Fred K. Beyer, 314 Mount Vernon, Royal Oak, Mich.

Filed Mar. 31, 1958, Ser. No. 725,419

1 Claim. (Cl. 172—376)

This invention relates to an earth-working tool particularly for hand use in gardens.

It is an object to provide a tool which serves as a combination rake and hoe with a capacity to break up earth and also to leave it in a smoothed-out condition.

It is also an object to provide a tool which can be adjusted for use by people of different physical builds so that it can be most efficiently adapted to the user.

It is another object to provide a tool which is self-sharpening and self-cleaning.

Other objects and features of the invention relating to the construction and operation will be apparent in the following description and claim.

Drawings accompany the invention, and the various views thereof may be briefly described as:

Figure 1, a side view of the device in position for use.

Figure 2, an end elevation on line 2—2 of Figure 1.

Figure 3, a sectional view on line 3—3 of Figure 1 showing the plane of the tool portion.

Figure 4, a sectional view of the cutting blade on line 4—4 of Figure 2.

Figure 5, a view of the entire tool with handle.

Referring to the drawings, as viewed in Figure 2, the tool consists primarily of a U-shaped member having a horizontal portion indicated generally at 10 and side legs 12 and 14. A handle 16 has a bifurcate end portion 18 with arms 20 and 22 which overlie portions of legs 12 and 14 and are bolted thereto by bolts 24 and 26. A common means of blocking the joint against motion is utilized, such as lock washers and serrated surfaces.

The blade portion 10 viewed in plan is shown to be composed of a flat piece of metal having good wearing characteristics shaped in a series of trapezoids 30 which are positioned together alternately at the narrow and the wide parallel sides, as, for example, respectively at 34 and 32. This creates a serration edge on each side of the tool, the end trapezoids being joined with the legs 12 and 14.

The tool is also formed with joints between the trapezoids which lie at an angle to each other. In the embodiment shown, the angle is about 90°. Thus, when the tool is viewed as shown in Figure 2, it also presents a serrated shape.

The edges of the tool are preferably chamfered at 36 (Figure 4) to provide cutting edges for biting into the soil and also for cutting roots and weeds.

As shown in Figure 1, with the working tool assembled to the handle at the angle shown in solid lines, it has a certain angle to the earth, depending on the angle at which the handle is held. This can be varied by shifting the legs 12 relative to the arms 20 and 22, and for a tall person the angle would be less relative to the handle than it would be for a short person.

The tool may also be turned over so that both edges can be used to the same degree if desired; and as the tool is worked back and forth in the soil, it will tend to clean out any soil that might normally lodge in the recesses of the blade. Also, as the tool wears, it actually creates a sharpening action on the edges so that they need very little care to remain functional.

I claim:

A garden earth-working tool comprising a U-shaped member having legs and a bight portion, the bight portion extending in general direction normal to the two legs to work as a horizontal member and being shaped in a series of flat, generally trapezoidal pieces integrally joined alternately at the narrow and the wide parallel sides, the narrow sides being joined to the narrow sides and the wide sides being joined to the wide sides, the sides each being disposed at an angle to each other to provide a saw-tooth sectional configuration and saw-tooth fore and aft edge configuration, said edges being cut to an angle from the plane of the pieces to provide a sharpened edge for fore and aft working into garden earth, the apices of the saw-tooth sectional configuration being widest fore and aft at the bottoms of the bight portion, said leg portions being adapted to be fastened to a bifurcate end of a manipulating handle.

References Cited in the file of this patent

UNITED STATES PATENTS

| 149,885 | Sanders | Apr. 21, 1874 |
| 1,334,586 | Baker | Mar. 23, 1920 |
| 1,633,318 | Drish | June 21, 1927 |
| 2,536,180 | Hines | Jan. 2, 1951 |
| 2,760,422 | Wolf | Aug. 28, 1956 |

FOREIGN PATENTS

| 134,331 | Austria | July 25, 1933 |